UNITED STATES PATENT OFFICE.

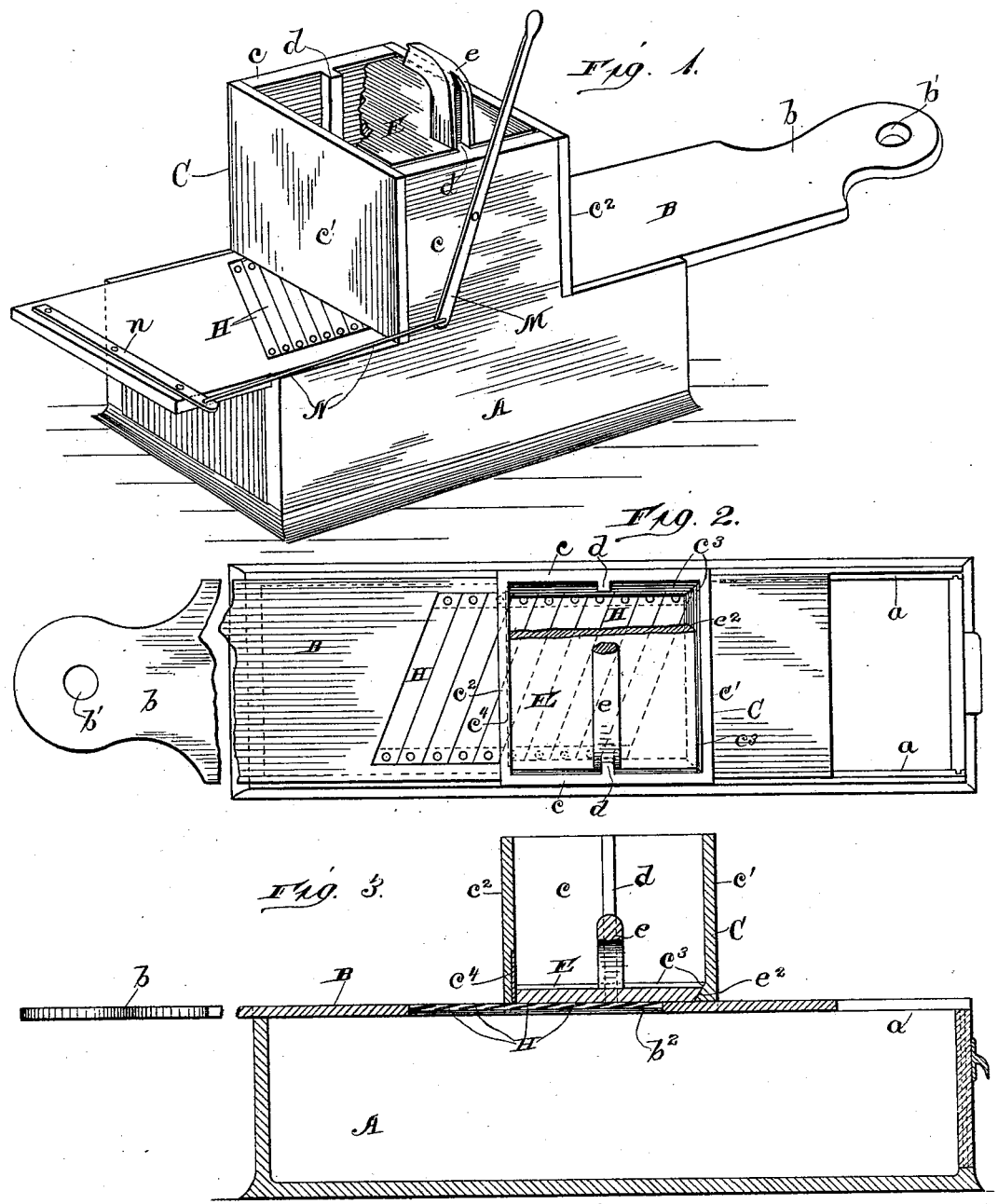

NARCISSE HENEAULT AND THERESIA HENEAULT, OF CHICAGO, ILLINOIS.

VEGETABLE-SLICER.

SPECIFICATION forming part of Letters Patent No. 521,540, dated June 19, 1894.

Application filed February 19, 1894. Serial No. 500,703. (No model.)

*To all whom it may concern:*

Be it known that we, NARCISSE HENEAULT and THERESIA HENEAULT, citizens of the United States, and residents of Chicago, in the county of Cook and State of Illinois, have invented certain new and useful Improvements in Vegetable-Slicers, of which the following is a specification.

This invention relates to improvements in a device for slicing vegetables, such as potatoes, cabbage-heads, onions, turnips, and the like, and while it is more especially adapted for such a purpose, yet it can be used for slicing apples and other fruits, or may be used for chipping dried-beef or other dried meats; and it consists in certain peculiarities of the construction, novel arrangement, and operation of the various parts thereof, as will be hereinafter more fully set forth and specifically claimed.

The objects of our invention are first, to provide a slicer, which shall be simple and inexpensive in construction, effective in operation, strong and durable; and second, such a device, in which the vegetables, fruit, or other material to be sliced may be fed to the knives, in such a manner, as to prevent the danger of cutting the hands of the operator. Still another object of our invention, is to combine in one implement, a receptacle for the vegetables or fruit, before and while they are being sliced and another compartment to receive them after being cut, from which latter compartment they can be readily removed.

In order to enable others skilled in the art to which our invention pertains to make and use the same, we will now proceed to describe it, referring to the accompanying drawings, in which—

Figure 1, is a perspective view of our slicer, as it appears when ready for use, showing a portion of the feed-plunger, broken away, in order to exhibit its guide-cleat or bar. Fig. 2, is a plan view of the device, showing a portion of the feed-plunger and handle thereof, broken away to illustrate the position of the cutting-knives. Fig. 3, is a longitudinal sectional view of the entire device, showing the knife-carrying-board fore-shortened for the convenience of illustration, and Fig. 4, is a detail sectional view of a portion of the knives or blades and their board.

Similar letters refer to like parts throughout the different views of the drawings.

A, represents the main frame or base-receptacle, which is made of any suitable size, form, and material, but preferably of wood, and rectangular in form. This receptacle is a box, having its upper portion, only, open, each of the sides of which is formed with a mortise $a$, for the guidance of the knife-carrying-board B, which is of suitable size and length, to cover the top of the box or receptacle A, and to project beyond its ends. One end of the board B, is formed with a handle $b$, which is provided with a hole $b'$, to permit of the board being hung up, when not in use.

On the upper part and about the middle of the box A, is a hopper or receptacle C, the side pieces $c$, of which may be a portion of the sides of the receptacle A, or may be separate-pieces secured thereto, as desired. The end-pieces $c'$, and $c^2$, of the hopper extend cross-wise of the box A, and rest on the upper edges of the sides thereof, thus allowing the knife-carrying-board to move thereunder. On the inner surfaces of the sides $c$, are secured upright cleats $d$, for the guidance of the feed-plunger or follower E, which plunger is provided with a handle $e$, extending across the same, and by means of which the plunger is raised or lowered. The handle $e$, and the plunger, is provided on each side with a vertical groove $e'$, for the reception and operation of the cleats $d$, which holds the plunger in a vertical position, and prevents any lateral motion thereof. The sides $c$, of the hopper and the end $c'$, thereof, are provided at their lower portions with inward bevels $c^3$, while the lower portion of the end-piece $c^2$, is provided on its inner surface with a metal-plate $c^4$, which renders the cutting of the vegetables or fruits more effective. The portions of the plunger or follower E, corresponding to the beveled parts $c^3$, of the hopper C, are likewise beveled, as shown at $e^2$, while the part of the plunger adjacent to the metal-plate $c^4$, is vertical and fits closely to said plate. The board B, is formed at its central portion with an opening $b^2$, across which is placed and secured obliquely a series of knives or blades H, which knives are set angularly, as well as obliquely on the board, in order to effect a shearing cut when drawn forward or pushed by means of the hand.

From the foregoing description it will be seen and understood, that by placing the vegetables or fruit in the hopper C, and placing the feed-plunger thereon, that the same may be sliced by drawing the knife-carrying-board B, back and forth, and that each one of the knives H, will operate upon the material, and render the operation of slicing a quick and easy matter. As the material is sliced, it will fall from the blades into the receptacle A, and the feed-plunger or follower E, will continually keep the vegetables within the hopper pressed against the board B, so that the entire contents may be sliced, without danger of injury to the hand of the operator. The beveled part of the lower portion of the hopper and the feed-plunger, prevents choking of the device and facilitates the egress of the material, as is apparent.

In order to facilitate the movement of the knife-carrying board, B, we fulcrum to one side of the hopper, a lever M, which is connected at its lower end to a rod N, which rod engages at its other end, with a bar $n$, secured to the knife-carrying-board.

Having thus fully described our invention, what we claim as new, and desire to secure by Letters Patent, is—

In a vegetable-slicer, the combination with the box A, having the mortises or guide-way $a$, for the knife-carrying-board, of the hopper C, having the guide-cleats $d$, and beveled portions $c^3$, the feed-plunger E, having the handle $e$, and the grooves $e'$, and adapted to operate within the hopper, the board B, having the opening $b^2$, and adapted to operate between the hopper and box A, and a series of knives secured to said board and obliquely and angularly across the opening therein, all constructed, arranged and operating, substantially as and for the purpose set forth.

NARCISSE HENEAULT.
THERESIA HENEAULT.

Witnesses:
CHAS. C. TILLMAN,
E. A. DUGGAN.